Figure 1:
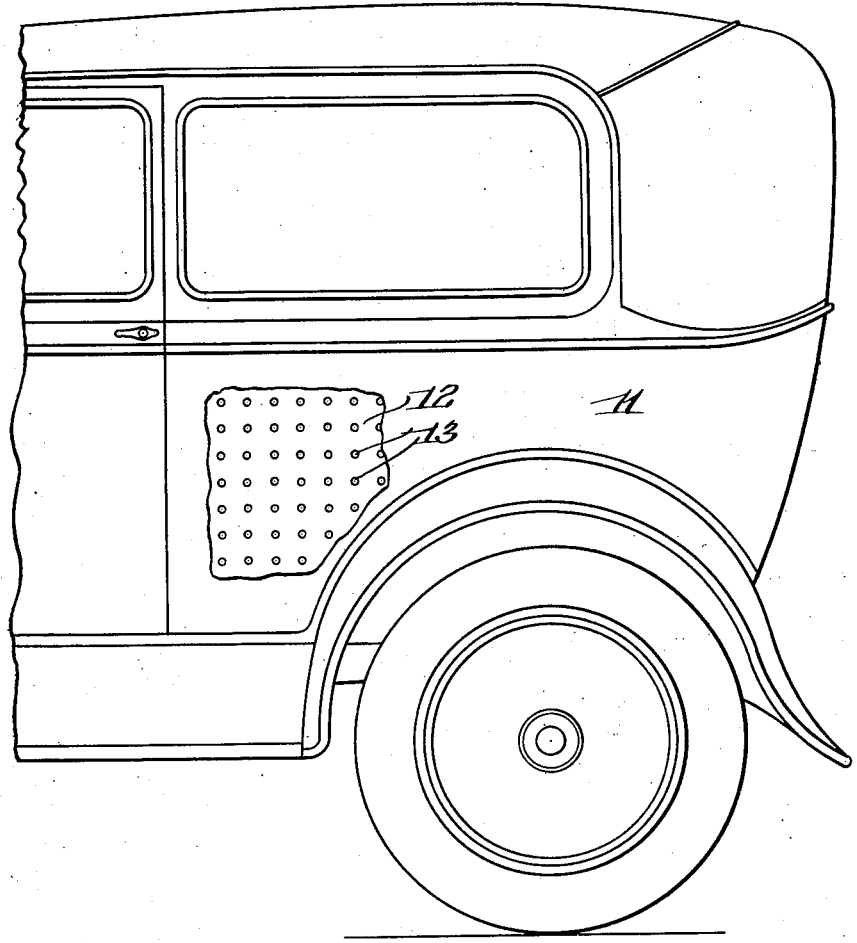

March 8, 1938.  C. A. UPSON  2,110,492

AUTOMOBILE INSULATION

Filed Aug. 6, 1931

INVENTOR
Charles A. Upson
BY Edward H. Cumpston
his ATTORNEY

Patented Mar. 8, 1938

2,110,492

UNITED STATES PATENT OFFICE 2,110,492

AUTOMOBILE INSULATION

Charles A. Upson, Lockport, N. Y., assignor to The Upson Company, Lockport, N. Y., a corporation of New York Application August 6, 1931, Serial No. 555,541

4 Claims. (Cl. 154—44)

This invention relates to automobile insulation and particularly to insulation intended to reduce noise in automobile bodies, as well as to insulate such bodies to some extent against the passage of heat or cold therethrough.

An object of the invention is the provision of simple, economical, efficient, and satisfactory insulation of the above character, which can be produced cheaply, shipped readily, and applied quickly to the automobile body, and which, when so applied, will result in a greatly improved body construction.

To these and other ends the invention resides in certain improvements and combinations of parts, all as will be hereinafter more fully described, the novel features being pointed out in the claims at the end of the specification.

Figure 2:
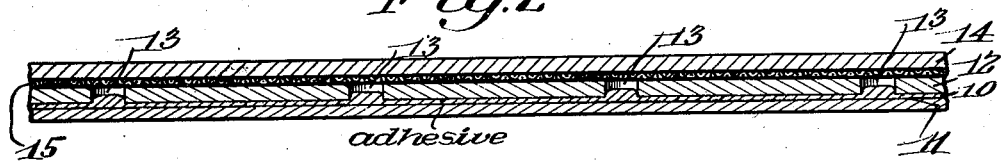

In the drawing:

Fig. 1 is a fragmentary side elevation of an automobile body with parts broken away showing the application of the insulation thereto, and Fig. 2 is a horizontal section through a portion of an automobile body showing the insulation.

According to the present invention, a layer of non-metallic insulating material is applied to the inner surface of the outer body sheet or layer, which is usually of sheet metal. This non-metallic insulating material preferably is applied to a substantial area of the inner surface of the body sheet, but may be applied to a part only of the surface of the body sheet if desired. The non-metallic insulating material, when formed and applied as herein described, is found to reduce materially the noise usually present in automobile bodies when the automobiles are traveling especially over rough roads, and also to reduce the passage of heat and cold through the body walls.

The non-metallic insulating material used according to the present invention is preferably of a fibrous character; that is, it is formed more or less of fibers, which may be cellulosic fibers such as paper fibers or the like. Preferably, this insulating material is somewhat soft, although preferably also in the form of a self sustaining sheet which can be manufactured cheaply and rapidly in a manner well known in the paper making and allied arts.

A specific material filling the requirements in an exceedingly satisfactory manner is found to be what is commonly known as felt paper, and it is of such material that the insulating layers of the present invention are preferably made.

According to the present form of the invention, a layer of this non-metallic fibrous material (preferably felt paper) is applied and affixed to the inner surface of the automobile body sheet (generally sheet metal) by means of a tacky adhesive such as asphaltum or the like. The layer of adhesive may be and preferably is relatively thick, as shown at 10 in Fig. 2 of the drawing, the metallic body sheet being illustrated at 11 and the layer of fibrous insulating material at 12 in the same figure. The thick layer of adhesive itself, as well as the insulating material 12, helps to reduce vibration in the metallic body sheet 11, thus damping or eliminating sound waves which would otherwise arise in or be transmitted through this sheet.

It is found in practice that the results are improved if the insulating sheet 12 be provided with a series of cavities. These cavities may be in the form of depressions or openings, of any suitable character, size, and spacing, and preferably are formed as perforations extending entirely through the sheet at regular intervals as shown at 13. For example, satisfactory results have been obtained from perforations in the form of circular holes of about one-quarter or one-half inch diameter, spaced fairly close together, say, about two inches center to center in both directions.

When perforations or other cavities or depressions are thus formed in the insulating sheet, the adhesive extends into these cavities, depressions, or perforations more or less, thus tending to lock the insulating material more firmly to the body sheet 11. At the same time, this construction seems to give some improvement in noise reducing characteristics, and while the exact scientific reasons for this are not fully known, it is suggested that it may be due to the air spaces within the cavities or perforations, or possibly to the masses of adhesive accumulating in the cavities, which may produce some additional damping effect upon the sheet metal 11.

Preferably also a second layer 14 of insulating material is applied to the layer 12 on the side opposite to the body sheet 11 and is affixed thereto by any suitable cement or adhesive. Where the cavities or depressions 13 are in the form of perforations extending entirely through the sheet 12, as shown in Fig. 2, then the additional sheet 14 preferably closes these perforations at their inner ends, as clearly illustrated in the drawing. This sheet 14 may be and preferably is also made of a layer of felt paper. Other layers or plies of the same material may be added if desired, although it is ordinarily found that the two layers 12 and 14 when made as above described will produce sufficiently good results at a sufficiently low cost to be practical.

In actual use, the two layers 12 and 14 of felt paper or the like are cemented or otherwise suitably attached to each other at the factory making the insulating material, the cavities or perforations previously having been formed in one of the layers. Then the two layers properly affixed to each other may be shipped together as a unit to the automobile factory or other place where they are to be used, either being rolled in a roll or cut into panels and stacked in flat form. Upon arrival at the automobile factory, the two layers are applied together as a unit to the inner surface of the automobile body sheet, with the layer 12 having the cavities 13 therein applied next to the body sheet as illustrated in Fig. 2, the layer 10 of tacky adhesive such as asphaltum being first applied either to the body sheet 11 or to the insulating layer 12, as desired.

Automobile bodies constructed as herein set forth, with insulation of the character disclosed, are found to be exceedingly quiet in actual use, being free or substantially free from the rumbles, rattles, squeaks, and other noises so frequently found in automobiles especially when traveling over rough roads.

Furthermore, bodies thus constructed are cooler in summer and warmer in winter than bodies of the usual type, due to the heat insulating effect of materials employed.

If it is desired to provide an insulating material of greater strength than one composed simply of the two layers 12 and 14 of felt paper, this may be done by adding a layer of strengthening fabric to the material, preferably between the layers 12 and 14, as shown at 15 in Fig. 2. This layer 15 is preferably a relatively inexpensive textile fabric of rather open weave or mesh, such for example as ordinary mosquito netting. The cement or adhesive used to secure the layers 12 and 14 to each other will easily pass through the open meshes of the netting.

Either or both of the layers 12 and 14 may be waterproofed in any suitable manner as by coating with wax, paraffin, asphaltum, or the like, and either or both of the layers may be fireproofed or rendered fire resistant in any suitable manner. Also either or both of the layers may be made not only of felt paper, disclosed above as the preferred material, but also of wool felt, textile fabric, an asbestos fibrous product, or other suitable material, preferably in the form of a self-sustaining sheet, and preferably relatively soft so as to have the desired sound damping qualities.

The invention is applicable equally well not only to those vehicles commonly known as automobiles, but also to the bodies of other types of vehicles, such as aeroplanes and motor boats, and it is intended in the claims to cover broadly the application of the insulation to any vehicle in which it is suitable.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. Flexible insulation adapted for application to curved side walls of an automobile body, said insulation comprising two layers of flexible felt paper secured to each other, one of said layers having a series of cavities therein which open freely on an exposed surface of said insulation, so that when said surface of said insulation is applied to a wall and affixed thereto by plastic material, said plastic material may partially fill and interlock with said cavities.

2. Flexible insulation adapted for application to curved side walls of an automobile body, said insulation comprising two layers of flexible felt paper secured together with an interposed strengthening layer of textile fabric, one of said paper layers having a series of cavities therein which open freely on an exposed surface of said insulation so that when said surface of said insulation is applied to a wall and affixed thereto by a plastic material, said plastic material may partially fill and interlock with said cavities.

3. Flexible insulation adapted for application to curved side walls of an automobile body, said insulation comprising two layers of flexible felt paper secured to each other, one of said layers having a series of cavities therein opening through an outer surface of said layer, and a layer of permanently tacky adhesive applied to said paper surface through which said paper cavities open for partially filling and interlocking with said cavities and securing said insulation to said side walls.

4. Flexible insulation adapted for application to curved side walls of an automobile body, said insulation comprising two layers of flexible felt paper secured together with an interposed strengthening layer of textile fabric, one of said paper layers having a series of cavities therein opening through the outer surface thereof, and a layer of permanently tacky adhesive applied over said paper surface through which said cavities open for partially filling and interlocking with said cavities and securing said insulation to said side walls.

CHARLES A. UPSON.